US010499042B2

(12) United States Patent
Babu et al.

(10) Patent No.: US 10,499,042 B2
(45) Date of Patent: Dec. 3, 2019

(54) BARRELING AND COMPOSITING OF IMAGES

(71) Applicant: Intel Corporation, Santa Clara, CA (US)

(72) Inventors: Ravindra A. Babu, Bangalore (IN); Sagar C. Pawar, Bangalore (IN); Satyanantha R. Musunuri, Bangalore (IN); Sashank Ms, Bangalore (IN); Kalyan K. Kaipa, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/477,045

(22) Filed: Apr. 1, 2017

(65) Prior Publication Data

US 2018/0286022 A1 Oct. 4, 2018

(51) Int. Cl.
| | |
|---|---|
| G06T 1/00 | (2006.01) |
| H04N 13/332 | (2018.01) |
| G06T 1/20 | (2006.01) |
| H04N 13/327 | (2018.01) |
| G06T 15/00 | (2011.01) |
| G06T 11/00 | (2006.01) |
| H04N 13/344 | (2018.01) |

(52) U.S. Cl.
CPC ............ *H04N 13/332* (2018.05); *G06T 1/20* (2013.01); *G06T 11/001* (2013.01); *G06T 15/00* (2013.01); *H04N 13/327* (2018.05); *H04N 13/344* (2018.05)

(58) Field of Classification Search
USPC ................... 345/156, 418, 419, 8, 7, 9, 420; 348/143, 222.1, 231.6; 359/631; 358/3.26; 702/103
See application file for complete search history.

(56) References Cited

U.S. PATENT DOCUMENTS

| | | | | |
|---|---|---|---|---|
| 5,726,670 | A  * | 3/1998 | Tabata ................. | G02B 27/017 345/7 |
| 5,748,264 | A  * | 5/1998 | Hegg ................. | G02B 27/0172 345/8 |
| 6,618,081 | B1 * | 9/2003 | Harada .................. | H04N 1/053 348/231.6 |
| 6,795,113 | B1 * | 9/2004 | Jackson ............ | G06F 17/30017 348/143 |
| 7,719,597 | B2 * | 5/2010 | Okada .................... | H04N 1/387 348/222.1 |
| 10,345,272 | B2 * | 7/2019 | Holmes .................. | G01N 29/04 702/103 |
| 2003/0001834 | A1* | 1/2003 | Chaw ...................... | G06T 13/40 345/418 |
| 2005/0213159 | A1* | 9/2005 | Okada .................... | H04N 1/387 358/3.26 |
| 2015/0062003 | A1* | 3/2015 | Rafii ....................... | G06F 3/017 345/156 |
| 2015/0091900 | A1* | 4/2015 | Yang ....................... | G06T 5/006 345/419 |

(Continued)

*Primary Examiner* — Thuy N Pardo
(74) *Attorney, Agent, or Firm* — Jordan IP Law, LLC

(57) ABSTRACT

Systems, apparatuses and methods may provide for technology that includes a substrate, and a display pipeline coupled to the substrate. The display pipeline may barrel an initial image to form a barreled image. In one example, the display pipeline further performs chromatic correction of the initial image.

25 Claims, 14 Drawing Sheets

(56) References Cited

U.S. PATENT DOCUMENTS

| | | | |
|---|---|---|---|
| 2016/0377869 A1* | 12/2016 | Lee | G02B 27/0172 359/631 |
| 2017/0016862 A1* | 1/2017 | Holmes | G01N 29/04 702/103 |
| 2017/0083104 A1* | 3/2017 | Namba | G06F 3/017 345/8 |

* cited by examiner

FIG. 11A Graphics Processor Command Format 900
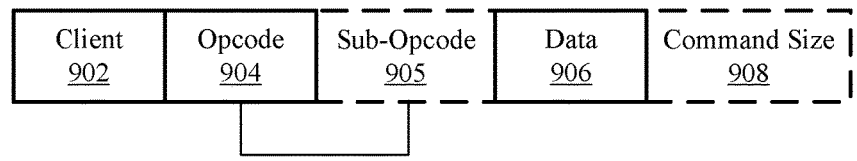
FIG. 11B Graphics Processor Command Sequence 910
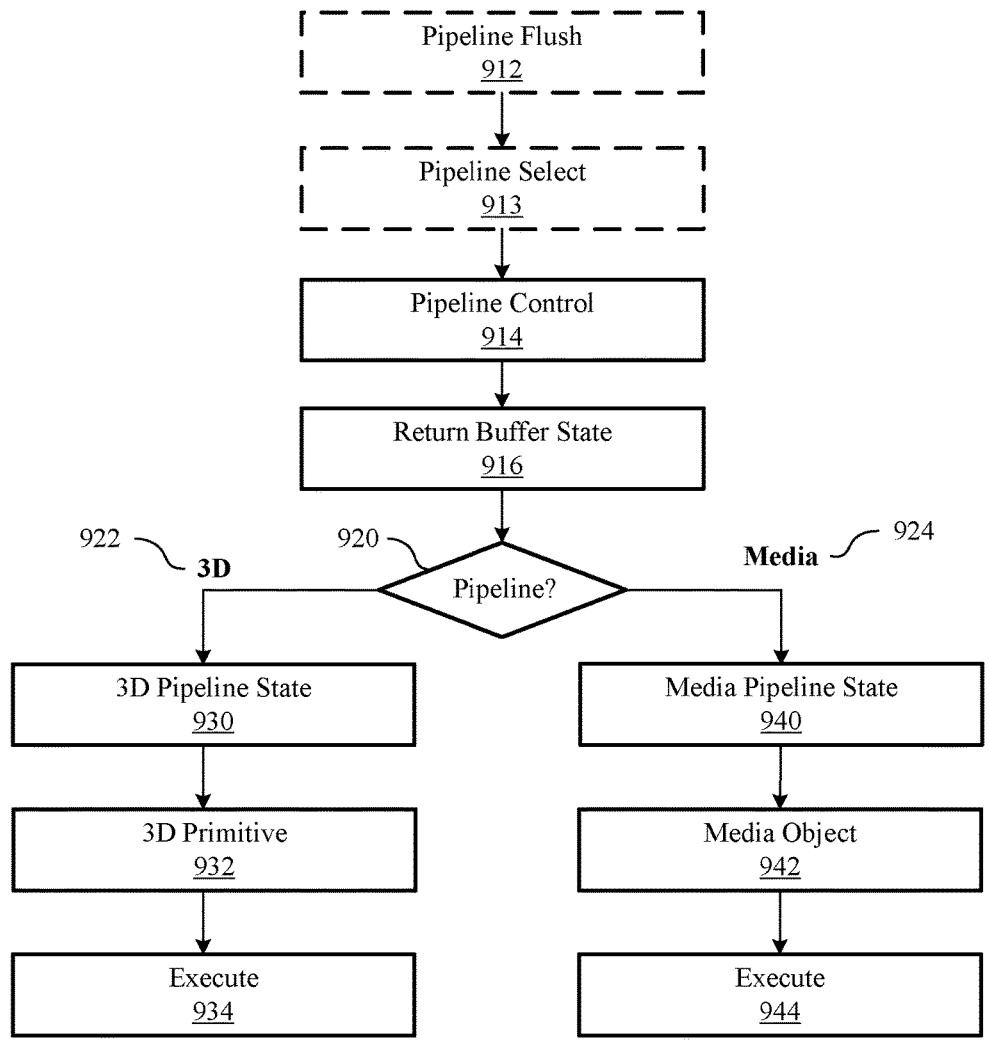

BARRELING AND COMPOSITING OF IMAGES

BACKGROUND

Embodiments generally relate to head mounted display (HMD) systems. More particularly, embodiments relate to rendering in HMD systems.

HMDs may be used in virtual reality (VR) and augmented reality (AR) applications to present visual content to the wearer in a wide variety of settings (e.g., immersive games and/or entertainment). A typical HMD may include a display that visually presents an image. In order to render content to the display, image data may be processed. More particularly, game applications may use hardware-accelerated graphics APIs (application programming interfaces) to leverage the capabilities of a local GPU (graphics processing unit), wherein this leveraging can include offloading graphical and non-graphical computation to the GPU in order to maintain interactive frame rates.

BRIEF DESCRIPTION OF THE DRAWINGS

The various advantages of the embodiments will become apparent to one skilled in the art by reading the following specification and appended claims, and by referencing the following drawings, in which:

FIGS. 11A-11B are block diagrams of examples of graphics pipeline programming according to an embodiment;

DETAILED DESCRIPTION

Figure 1:
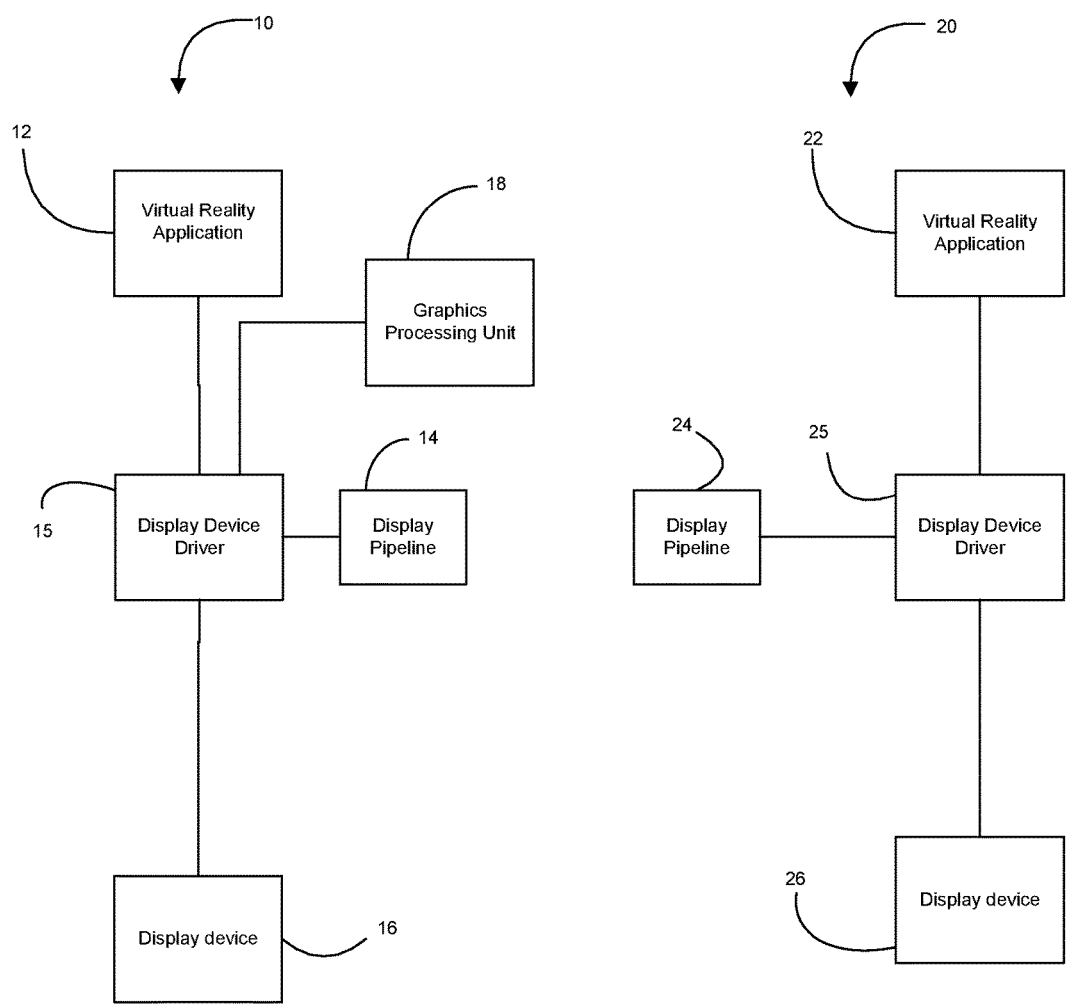
FIG. 1 is an illustration of an example of a conventional rendering architecture and an improved rendering architecture according to an embodiment.

FIG. 1 shows a conventional rendering architecture 10 and an improved rendering architecture 20. In the conventional rendering architecture 10, a display device driver 15 is provided. Further, a display device 16 is provided and may display images. For example, the display device 16 may be an HMD. The display device 16 may include at least one display screen to display a left image for the left eye of a user, and a right image for the right eye of the user. A left lens may be disposed between the display screen and the left eye, so that the left image is refracted and then viewed by the user. Likewise, a right lens may be disposed between the display screen and the right eye so that the right image is refracted and then viewed by the user. The lenses may increase a user's field of view. Thus, a VR or AR architecture may be presented to the user through the left and right images. A VR application 12 may provide image data to the display device 16 so that the VR or AR architecture is presented. While a VR application 12 is discussed herein, it is understood that an AR application, which would operate with AR frames, may also be provided and operate similarly to as described below with respect to the VR application 12.

The left and right images may be modified prior to being displayed. For example, the display screen may be a flat surface. When the left and right images are displayed on the display screen, the left and right images are projected through the left and right lenses, refracted by the left and right lenses, and may appear distorted to a user. For example, the left and right images may appear to have a pincushion distortion. To compensate for the pincushion distortion, a barreling distortion may be applied to the left and right images. That is, the left and right image are widened (e.g., "barreled") in the middle in the general shape of a barrel. The barreled left and right images may be displayed on the display screen, refracted by the left and right lenses, and viewed by the user to provide the VR or AR architecture.

The VR application 12 includes a virtual reality software development kit (VR SDK, not shown). The VR SDK may include a graphics library, such as such as DirectX or OpenGL, to allow interaction with a graphics processing unit (GPU) 18 and a display pipeline 14. The GPU 18 may be implemented in programmable logic such as, for example, programmable logic arrays (PLAs), field programmable gate arrays (FPGAs), complex programmable logic devices (CPLDs), etc., or any combination thereof.

The VR SDK may leverage the GPU 18 to perform several rendering operations. The VR SDK may obtain left and right image renderings. The VR SDK may then leverage the GPU 18, so that the GPU 18 performs composition on each of those left and right image renderings to create a composite left image and a composite right image from the left and right image renderings. The VR SDK may then further leverage the GPU 18 so that the GPU 18 barrel distorts the composite left and right images to create barreled left and right images. After these operations are complete, the VR SDK may interact with the display pipeline 14 through, for example, an API, to perform further operations to form displayable left and right images from the barreled left and right images. The illustrated display pipeline 14 may provide the displayable left and right images to the display device 16 to visually present the displayable left and right images in conjunction with a VR or AR architecture.

The improved rendering architecture 20 (which may also be referred to as a computing system) may include a display device 26 that visually presents images. The display device 26 may be an HMD. The display device 26 may be formed similarly to the display device 16. For example, the display device 26 may include at least one display screen to display a left image for the left eye of the user, and a right image for the right eye of the user. A lens may be disposed between the display screen and the left eye, so that the left image is refracted and then viewed by the user. Likewise, a lens may be disposed between the display screen and the right eye so that the right image is refracted and then viewed by the user. Thus, a VR or AR architecture may be presented to the user through the left and right images. A VR application 22 may include a VR SDK (not shown), which may include a graphics library, such as such as DirectX or OpenGL, to allow interaction with a display pipeline 24 of the improved rendering architecture 20. The display pipeline 24 may be a fixed-function unit in contrast to the GPU 18, which may be programmable logic.

The VR SDK of the VR application 22 may therefore leverage the display pipeline 24 to perform several rendering operations, which were performed with the GPU 18 in the conventional example. For example, the VR SDK may obtain left and right image renderings and use the display pipeline 24 to perform composition on each of those left and right image renderings to create a composite image rendering including the left and right composite image renderings. For example, a single composite image rendering may be based upon both the left and right image renderings.

The VR SDK may then further leverage the display pipeline 24 so that the display pipeline performs several other operations on the composite image rendering, including chromatic correction, scaling and barreling, to create a barreled composite image rendering including barreled left and right images. After these operations are complete, the display pipeline 24 may provide the barreled composite image to the display device 26 so that the display device 26 presents the barreled composite image to create the VR or AR experience. A GPU (not illustrated) may be included in the improved rendering architecture 20, but may not be necessary to perform the composition, chromatic correction, scaling and barreling described above. Thus, the display pipeline 24 may perform chromatic correction, scaling, composition and barreling.

The VR application 22, display pipeline 24 and display device driver 25 may each be a part of a system, for example a computing device (e.g., a mobile computing device, a desktop computer, a laptop, mobile phone, smart phone, tablet computing device, mobile Internet device, etc.). Furthermore, the display pipeline 24 may be coupled to a substrate. A GPU may also be included in the computing device. The display device 26 may be removably connected to the computing device through a USB cable for example.

The total motion-to-photon (M2P) latency may be important, as this is the time involved for a user movement to be fully reflected on a display screen. The total M2P latency should be under 18 milliseconds (ms) to allow for a desired user experience, for example without judder, and provide an immersive experience. In the conventional rendering architecture 10, the M2P latency may be greater than 18 ms, which still provides observable judder. In the conventional rending architecture 10, operations (e.g., composition, chromatic correction, scaling and barreling) to form the displayable left and right images may take 5-10 ms.

In the improved rendering architecture 20, by performing the operations, composition, chromatic correction, scaling and barreling, in the display pipeline 24 as a single operation, the total photon M2P is reduced by 3-8 ms as compared to the conventional rendering architecture 10 in which the GPU 18 may perform such operations. Thus, frame processing time is reduced in the improved rendering architecture 20, and the M2P latency is reduced as compared to the conventional rendering architecture 10. The reduced M2P latency of the improved rendering architecture 20 provides a more immersive experience and less judder.

Furthermore, the GPU of the improved rendering architecture 20 may perform other graphic intensive operations since the GPU may not need to perform the operations (composition, chromatic correction, scaling and barreling) discussed above. Moreover, less platform power is used in the improved rendering architecture 20 since the display pipeline 24 requires less power than a GPU, for example GPU 18. Therefore, the improved rendering architecture 20 may operate on battery power alone, as opposed to the conventional rendering architecture 10 which may need to be operate with an AC power cord plugged into a power source, not on battery power alone. As such, the improved rendering architecture 20 may achieve the following advantages over the conventional rendering architecture 10:

1) Less M2P latency,
2) GPU may perform more graphic intensive operations, and
3) Less power may be used.

Figure 2:
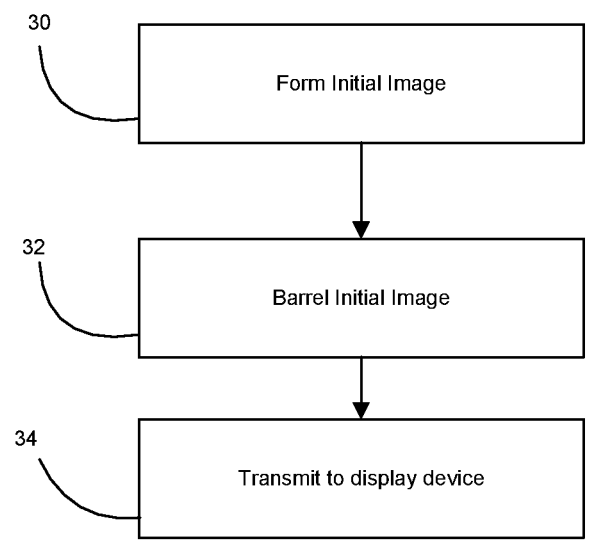
FIG. 2 is a flowchart of an example of a method of operating an improved rendering architecture.

With continuing reference to FIGS. 1 and 2, a method 28 of operating a display pipeline such as, for example, the display pipeline 24, is shown. The method 28 may be implemented in one or more modules in a set of logic instruction of a fixed-functionality logic hardware using circuit technology such as, for example, application specific integrated circuit (ASIC), complementary metal oxide semiconductor (CMOS) or transistor-transistor logic (TTL) technology, Arithmetic Logic Unit (ALU) or any combination thereof. The VR application 22 may render a left image (or left image rendering) and a right image (or right image rendering) using a graphics library, for example DirectX or OpenGL, and VR SDKs. The left and right images may be in a red green blue alpha format. The display pipeline 24 may receive the left and right images from the display device driver 25 for example. The display device driver 25 may provide the left and right images as different display image planes.

Illustrated block 30 forms an initial image. Some of the planes in the initial image may be overlaid on one another and contain different information from other planes. The display pipeline 24 may perform composition on the left and right images to form a composed or composite image (which may also be referred to as the "initial image") by combining the left and right images (or image planes) into the single composite image or single frame. The left and right images may be on different planes in the composite image. For example, the left image may be on a left side (or left plane) of the composite image and the right image may be on a right side (or right plane) of the composite image or side-by-side. The display device driver 25 may aid in the above by interfacing with the VR application 22 and display pipeline 24.

In some embodiments, the display pipeline 24 may determine multiple display image depth planes corresponding to the left and right images. For example, the display pipeline 24 may determine that a sprite depth plane of the left image (or left image rendering) is to be a sprite, and a background depth plane of the left image (or left image rendering) is to be a background scene. The sprite depth plane and the background depth plane may be stacked on each other in the composite left image, with the sprite image being overlaid or on top of the background scene. Similarly, for the right image (or right image rendering), a sprite depth plane may be overlaid on a background depth plane. The left and right images may be combined to form the new composite image as discussed above. The left and right images may be on different planes in the composite image to be side-by-side.

After the composite image (i.e., the initial image) is formed, the composite image is subjected to further transformations, including barreling as illustrated in block 32.

Each pipe of the display pipeline 24 may have a barreling enable bit. The barreling enable bit, when enabled, indicates that barreled output process is allowed. The barreling enable bit may be set by the display device driver 25, and when the display device driver 25 detects a display device such as an HMD being connected to the display device driver 25. The barreling enable bit of the pipe of the display pipeline 24, which is to barrel the composite image, is enabled by the display device driver 25.

Specific values of the display device 26 may also need to be determined. That is, specific values of the lenses of the display device 26 must be determined. While a detailed discussion of the lenses is referenced herein, it is understood that a lens unit may also be used, and the specific values of the lens unit may be calculated and used in a similar manner as discussed below. The specific values of the lenses may vary according to manufacturer of an HMD, and design of the HMD. Accordingly, the specific values may be dynamically determined and/or updated by the display pipeline 24.

For example, the specific values may include the width and height of at least one of the lenses (e.g., the left and right lenses of an HMD) of the display device 26. The display device 26 may be connected to a computing device which includes the display pipeline 24. The connection between the display device 26 and the computing device may be a USB cable. Upon the connection being completed, the display device driver 25 may read from the INF file, windows registry, operating system running environment, or another mechanism to dynamically detect the specific values, and then program the specific values into the display pipeline 24. The display device driver 25 may be used to determine the specific values by dynamically retrieving the specific values from the display device, and providing the specific values to the display pipeline 24. Therefore, the display pipeline 24 may dynamically update the specific values.

Global variables may be determined as follows:

$X_{mid}$=a width of a lens of the display device/2, $Y_{mid}$=a height of the lens/2, and $R_{max}=\sqrt{(X_{mid}^2+Y_{mid}^2)}$.

Each pipe of the display pipeline 24 may have three registers into which the values for $X_{mid}$, $Y_{mid}$ and $R_{max}$ are respectively stored. The display device driver 25 may dynamically calculate these global values $X_{mid}$, $Y_{mid}$ and $R_{max}$, and provide these global values to the display pipeline 24. In some embodiments, the display device driver 25 may program the three registers to include $X_{mid}$, $Y_{mid}$ and $R_{max}$ every "flip," or every time a frame is to be changed. The flip may also correspond to the refresh rates of frames of the display device. In some embodiments, the display pipeline may also determine $X_{mid}$, $Y_{mid}$ and $R_{max}$ from the specific values determined by the display device driver 25.

The composite image may be pre-processed. In some embodiments, a certain part of the composite image is preprocessed and then loaded into a buffer or local memory for further processing. In some embodiments, a next frame to render is unavailable, so the system may also render a current frame by preprocessing. In some embodiments, if the composite image is unsuitable, the composite image may be dropped and another composite image may be fetched to replace the unsuitable composite image.

A radius, scaling factor, barreling values and distorted values may be determined by the display pipeline 24. The display pipeline 24 is to determine with respect to each pixel of the composite image, where x and y are the location of the pixel as they would be displayed on the display of the display device 26, the following values:

Calculate Radius, Scaling Factor, Barreling Values and Distorted Values:

Radius from current pixel to midpoint: $P_r=\sqrt{((X_{mid}-\text{current } x,2)+(Y_{mid}-\text{current } y,2))}$, Scaling Factor: $SF=P_r/R_{max}$, Barrel Distortion Value: $newR=P_r*(0.24*SF^4+0.22*SF^2+1)$, Calculate Distorted Values:

New Angle: Alpha=$a\tan^2(-(y-Y_{mid}),-(x-X_{mid}))$, newX=absolute value(cos(Alpha)*newR-$X_{mid}$), newY=absolute value(sin(Alpha)*newR-$Y_{mid}$), and gnRadius=$\sqrt{((X_{mid}-newX)^2+(Y_{mid}-newY)^2)}$.

Based upon the above, newX may correspond to a new X coordinate of the pixel, newY may correspond to a new Y coordinate of the pixel, and gnRadius may correspond to a distortion radius. The newX coordinate and newY coordinate may form a new position for the pixel. After the above values are calculated with respect to each pixel, a pixel map, including the above values ($P_r$, SF, newR, Alpha, newX, newY and gnRadius) is stored in a display buffer. Each current pixel of the composite image is replaced with new values as indicated below.

After the above variables are determined for each pixel, a new barreled image may be generated from the distorted values stored in the pixel map. In some embodiments, the display pipeline 24 may determine if each pixel fits with the lens radius of the lens of the display device 26 by comparing newR to gnRadius, and only copying that pixel's R, G, B values if that pixel is within the lens radius. In some embodiments, one or more predetermined criteria are used to determine if the pixel is copied. In some embodiments, only at least half of the pixels need to be processed as discussed above before the new image may begin to be generated. For each pixel, the following equation may be used to replace the pixels of the composite image with new pixels and form a new barreled composite image:

If newR=gnRadius

R=pixelmap[pixelmap[0]·newX][pixelmap[0]·newY]·R,

G=pixelmap[pixelmap[0]·newX][pixelmap[0]·newY]·G,

B=pixelmap[pixelmap[0]·newX][pixelmap[0]·newY]·B,

A=255;

If newR≠gnRadius

A=0.

NewX and NewY are the new position of the pixel. In the above, the value A corresponds to the transparency of the image. As such, when A=255, a full image is shown (i.e., when newR is equal to gnRadius) and the pixel is unmasked, but when A=0 the image is blacked out (i.e., when newR is not equal to gnRadius), to be masked. Therefore, when newR is not equal to gnRadius, A is set to zero. Since A is set to zero, the pixel value for colors (R, G, B) may not need to be copied and stored. So for pixels in which newR=gnRadius, the pixels may display different colors depending on their R, G, B values to form an image (e.g., a house), but for pixels in which newR is not equal to gnRadius, the pixels are all blacked out and may not display an image. That is, newR may be used to determine which pixels are used to form the image, as noted above, similar to a mask in which pixels falling within the range of newR are displayed with their RGB values displayed, and pixels outside of newR have their RGB values overridden and simply display black.

In illustrated block 34, after the new barreled composite image is built, the display engine 24 may start to output the data of the image to the display device 26 to display the barreled composite image on the display device 26.

In some embodiments, the display pipeline 24 may also perform chromatic correction of the left and right images. In some embodiments, the chromatic correction may occur before the composite image is barreled. The display pipeline 24 may also perform scaling on the barreled image.

System Overview

Figure 3:
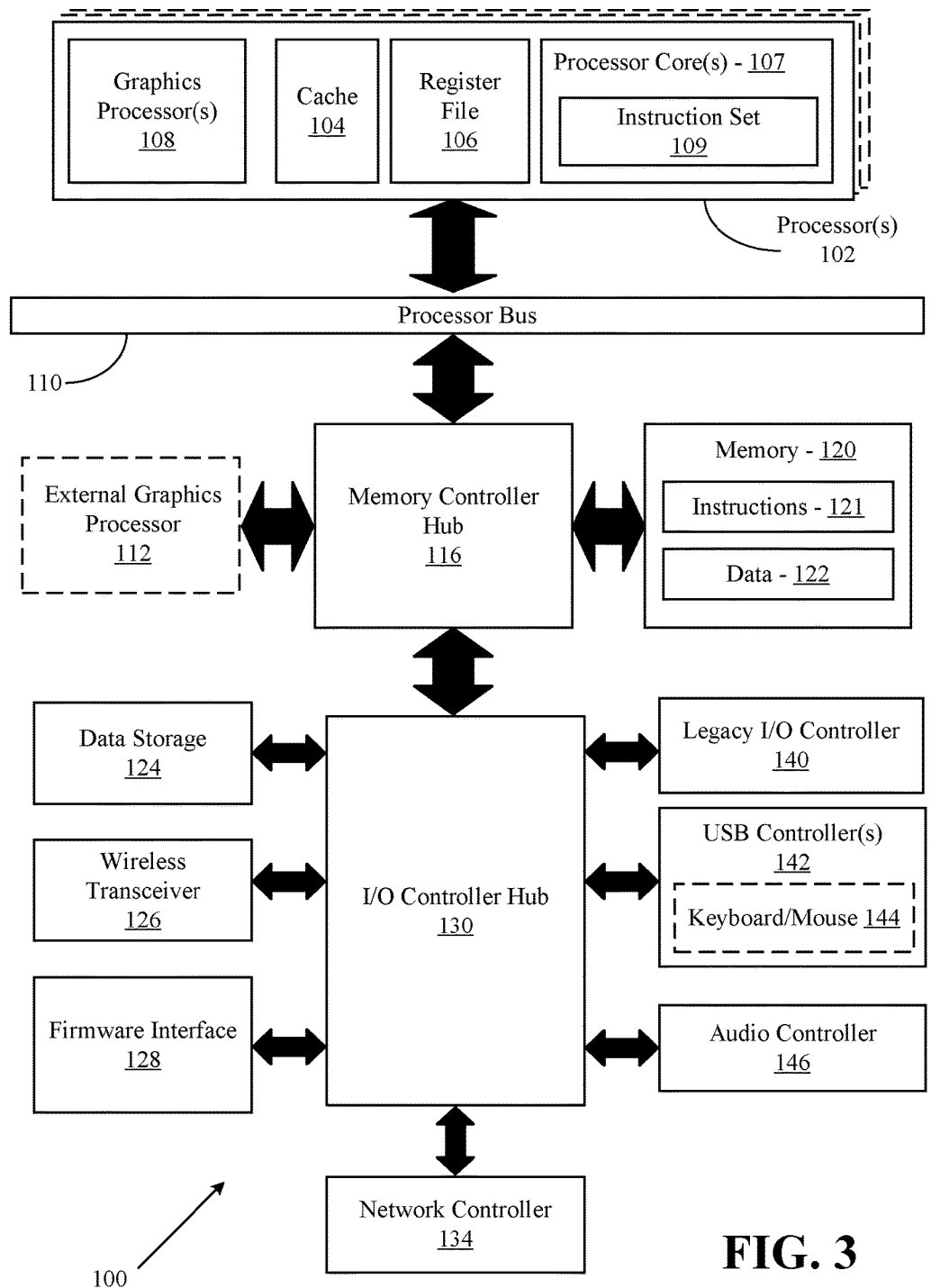
FIGS. 3-5 are block diagrams of an example of an overview of a data processing system according to an embodiment.

FIG. 3 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 4:
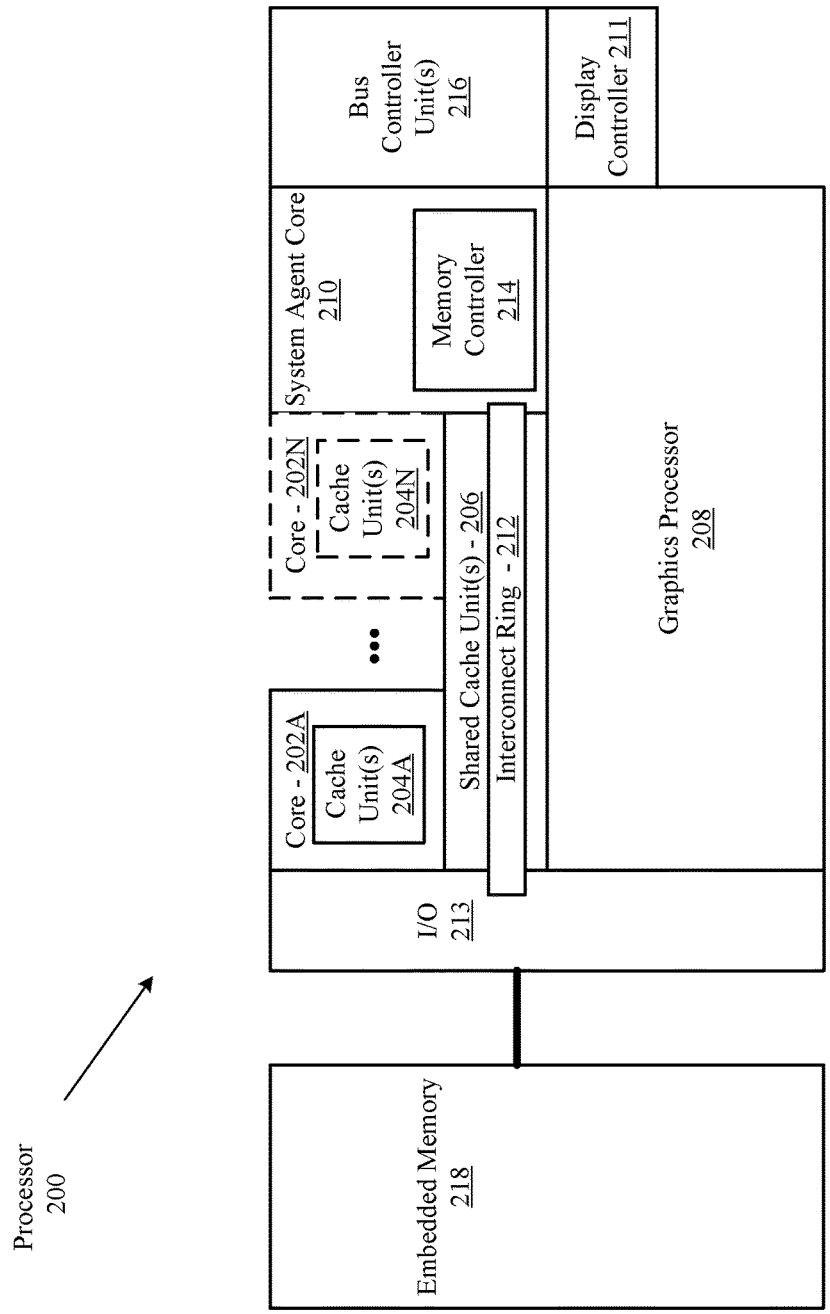

FIG. 4 is a block diagram of an embodiment of a processor 200 having one or more processor cores 202A-202N, an integrated memory controller 214, and an integrated graphics processor 208. Those elements of FIG. 4 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 5:
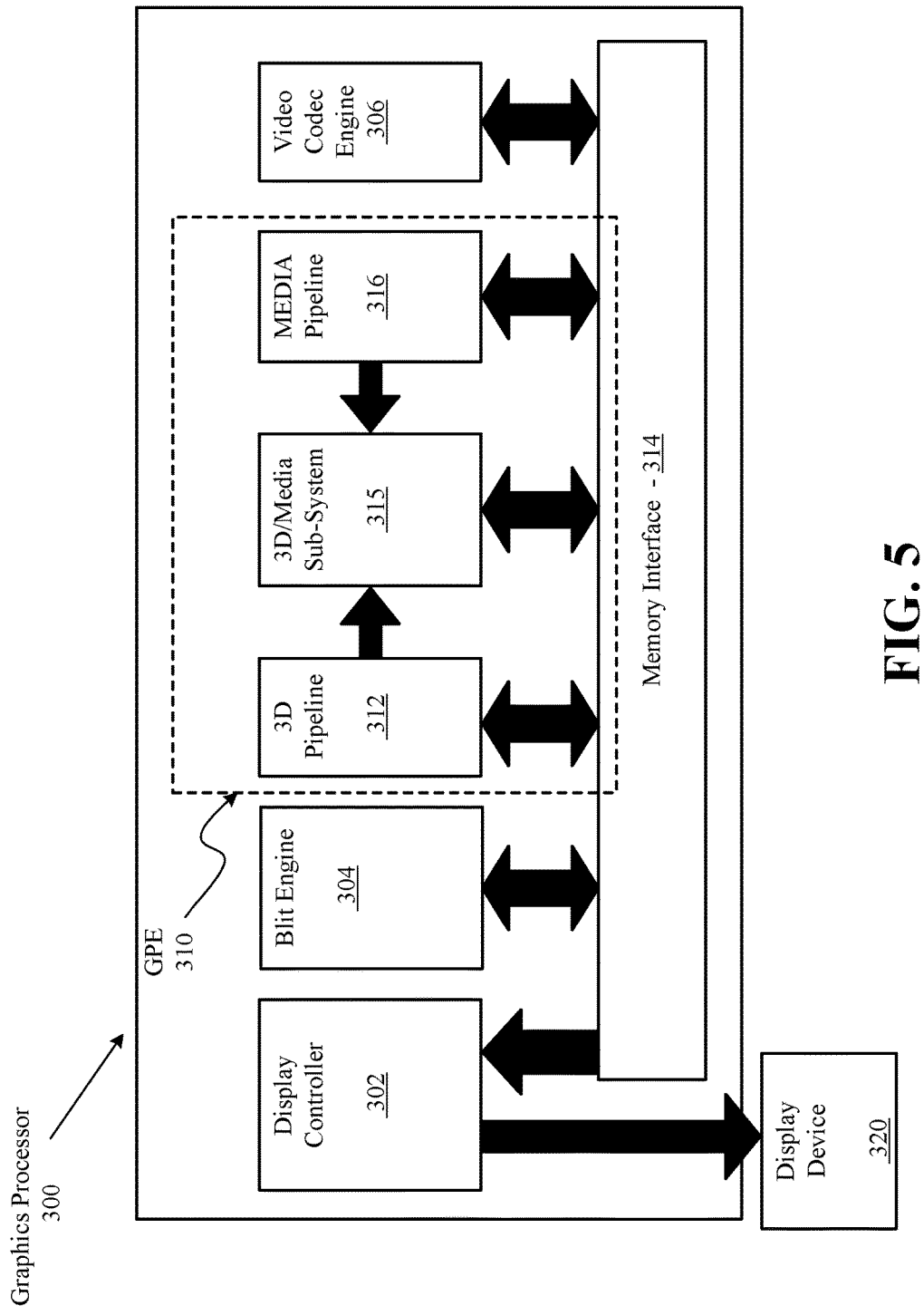

FIG. 5 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 6:
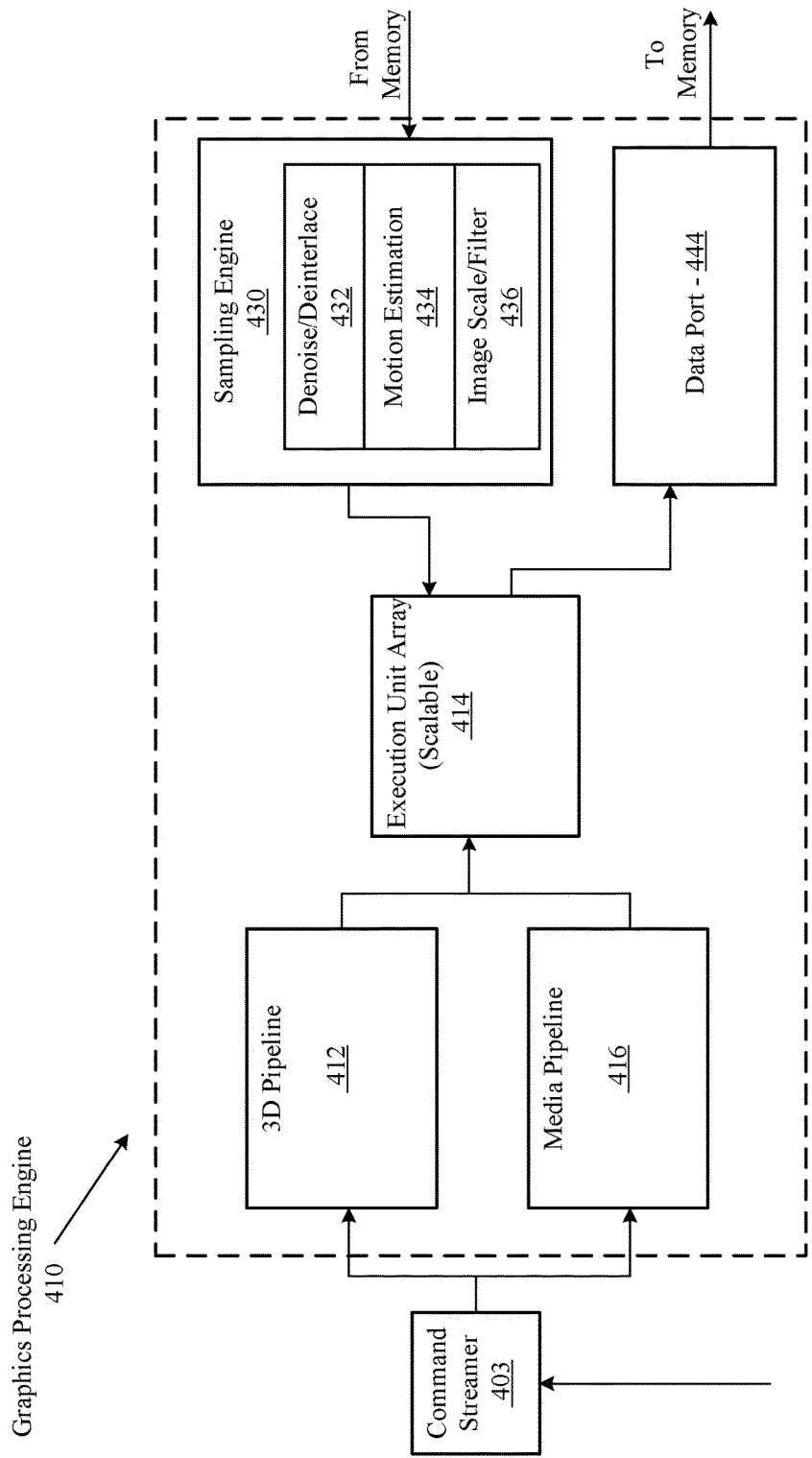
FIG. 6 is a block diagram of an example of a graphics processing engine according to an embodiment.

FIG. 6 is a block diagram of a graphics processing engine 410 of a graphics processor in accordance with some embodiments. In one embodiment, the GPE 410 is a version of the GPE 310 shown in FIG. 5. Elements of FIG. 6 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 7:
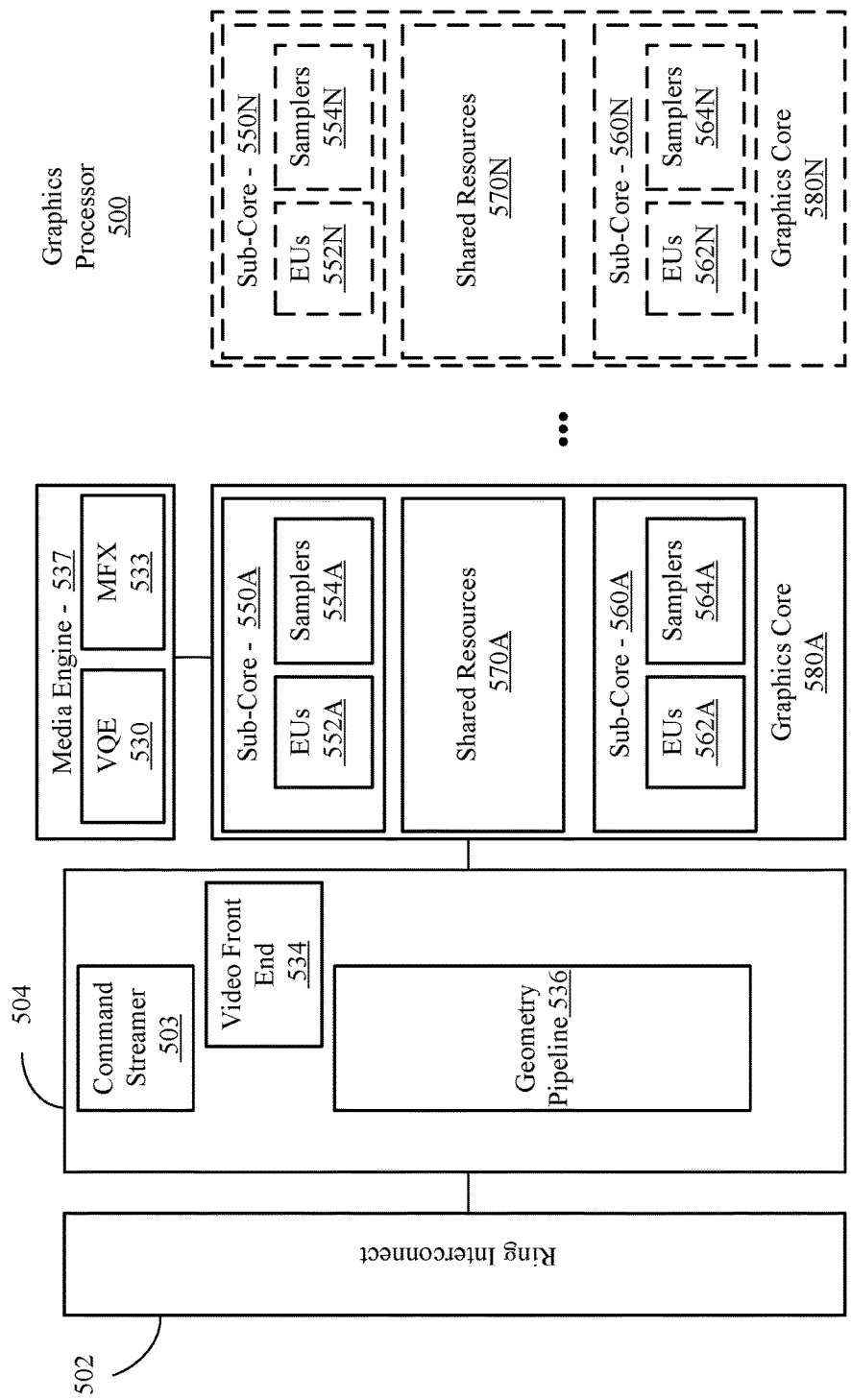
FIGS. 7-9 are block diagrams of examples of execution units according to an embodiment.

FIG. 7 is a block diagram of another embodiment of a graphics processor 500. Elements of FIG. 7 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 8:
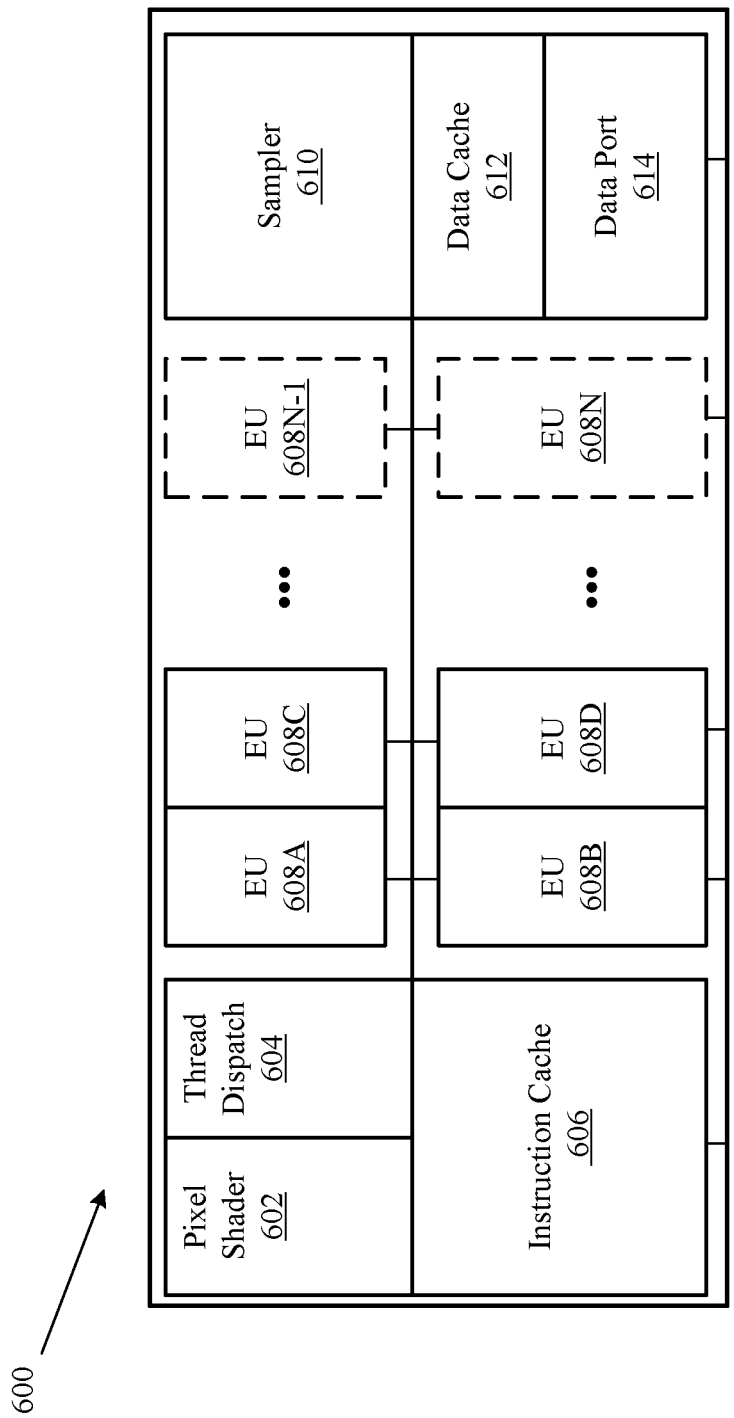

FIG. 8 illustrates thread execution logic 600 including an array of processing elements employed in some embodiments of a GPE. Elements of FIG. 8 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 7) dispatches vertex processing, tessellation, or geometry processing threads to thread execution logic 600 (FIG. 8). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 9:
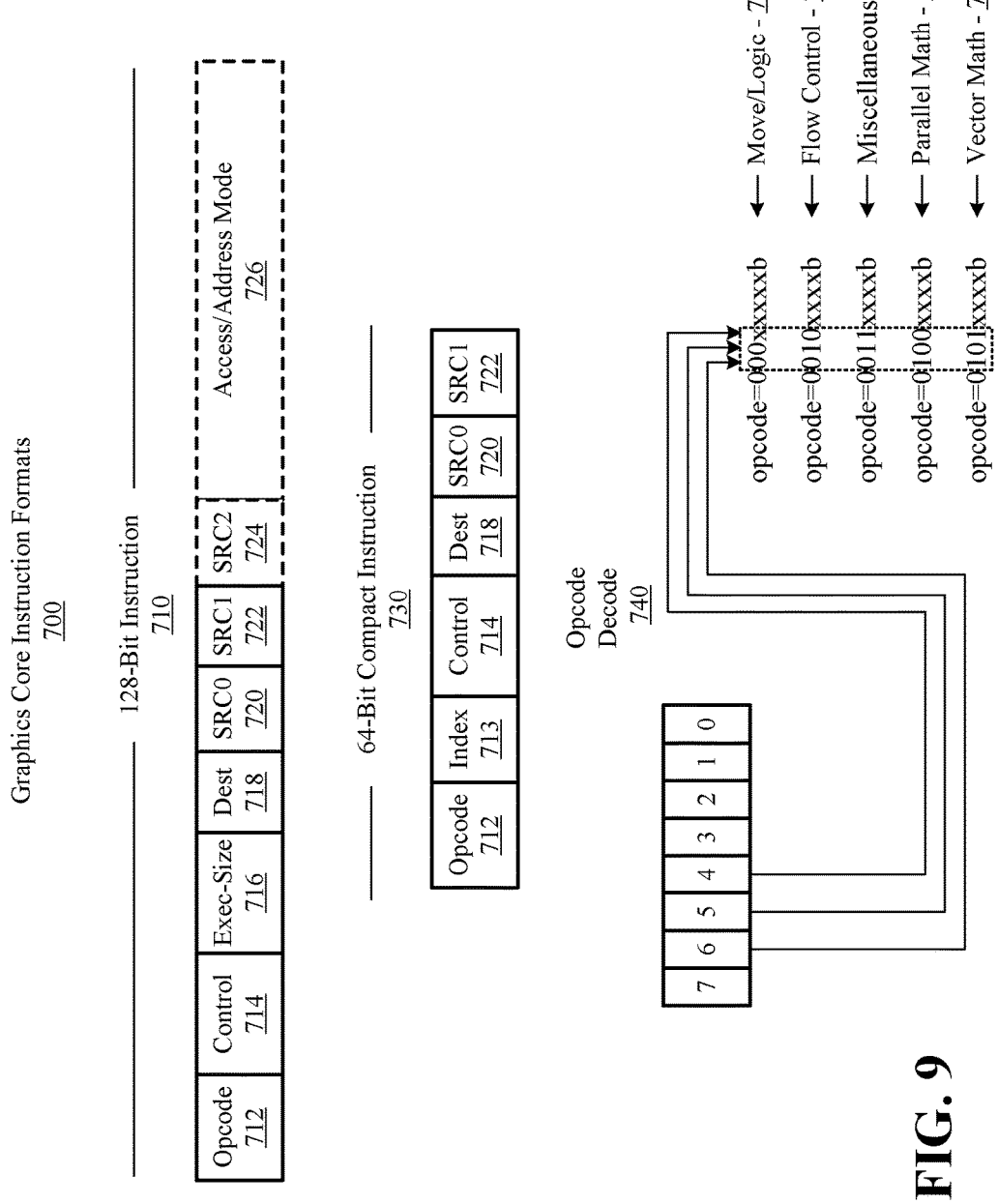

FIG. 9 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 10:
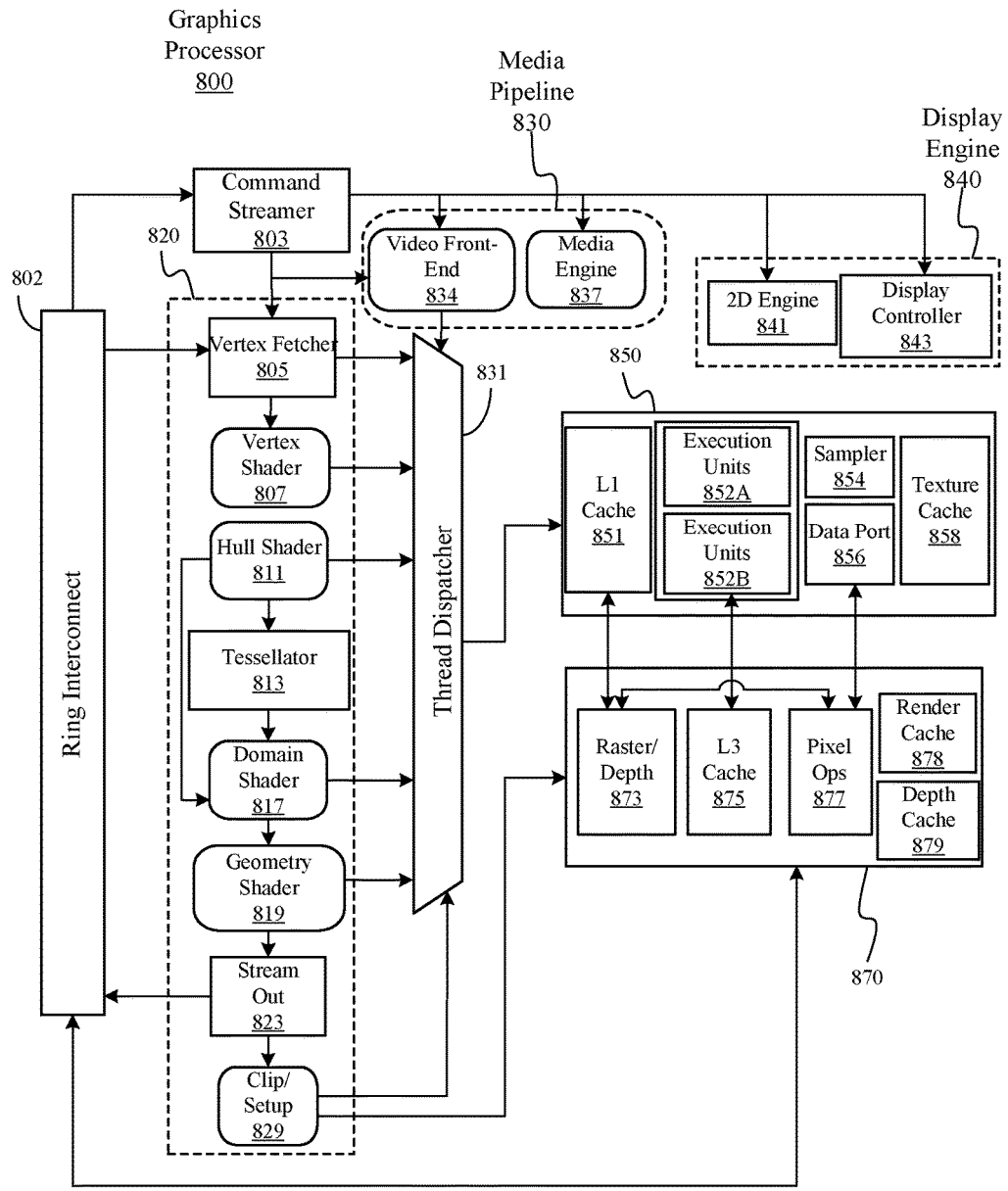
FIG. 10 is a block diagram of an example of a graphics pipeline according to an embodiment.

FIG. 10 is a block diagram of another embodiment of a graphics processor 800. Elements of FIG. 10 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 11A is a block diagram illustrating a graphics processor command format 900 according to some embodiments. FIG. 11B is a block diagram illustrating a graphics processor command sequence 910 according to an embodiment. The solid lined boxes in FIG. 11A illustrate the components that are generally included in a graphics command while the dashed lines include components that are optional or that are only included in a sub-set of the graphics commands. The exemplary graphics processor command format 900 of FIG. 11A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 11B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 12:
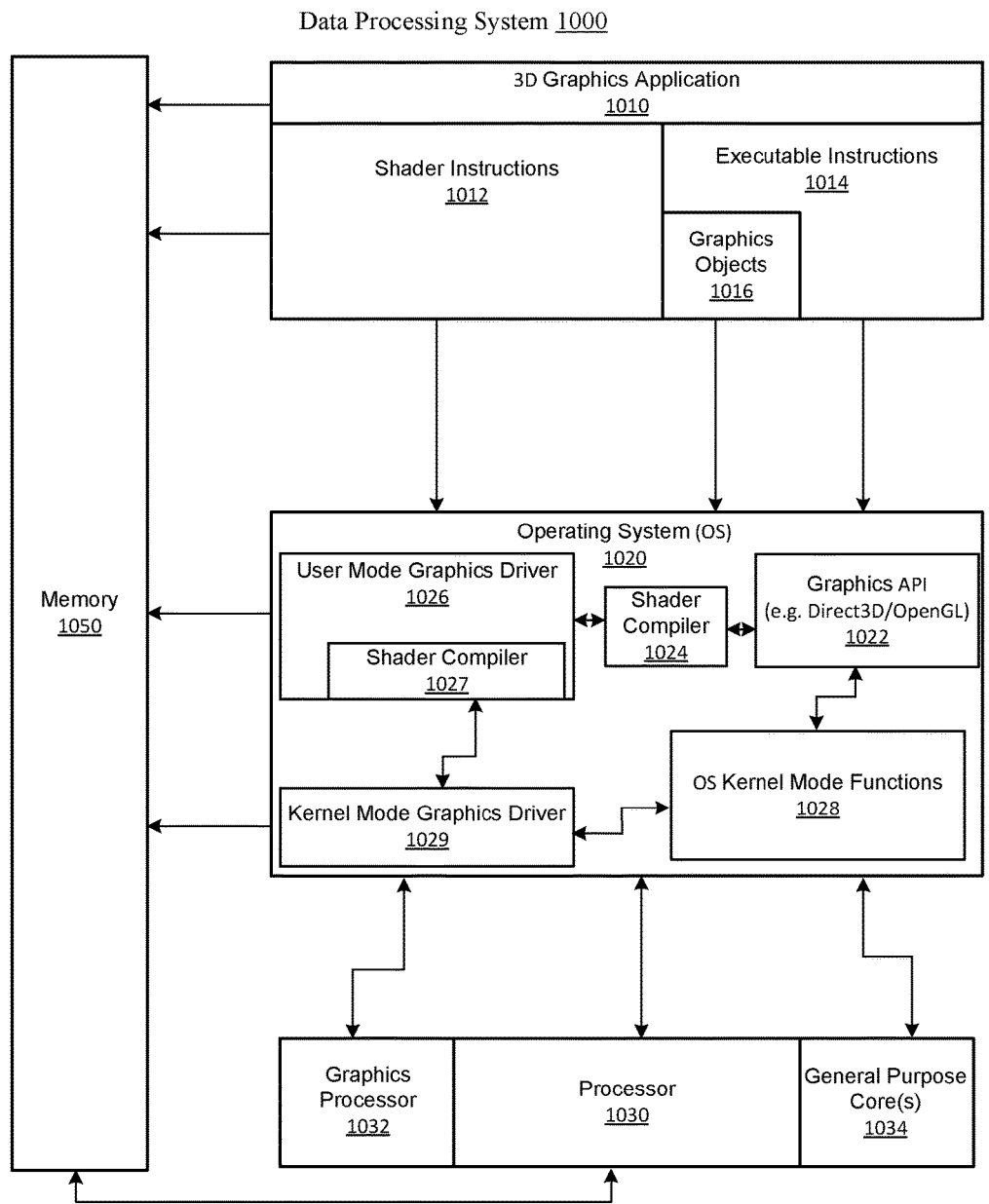
FIG. 12 is a block diagram of an example of a graphics software architecture according to an embodiment.

FIG. 12 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 13:
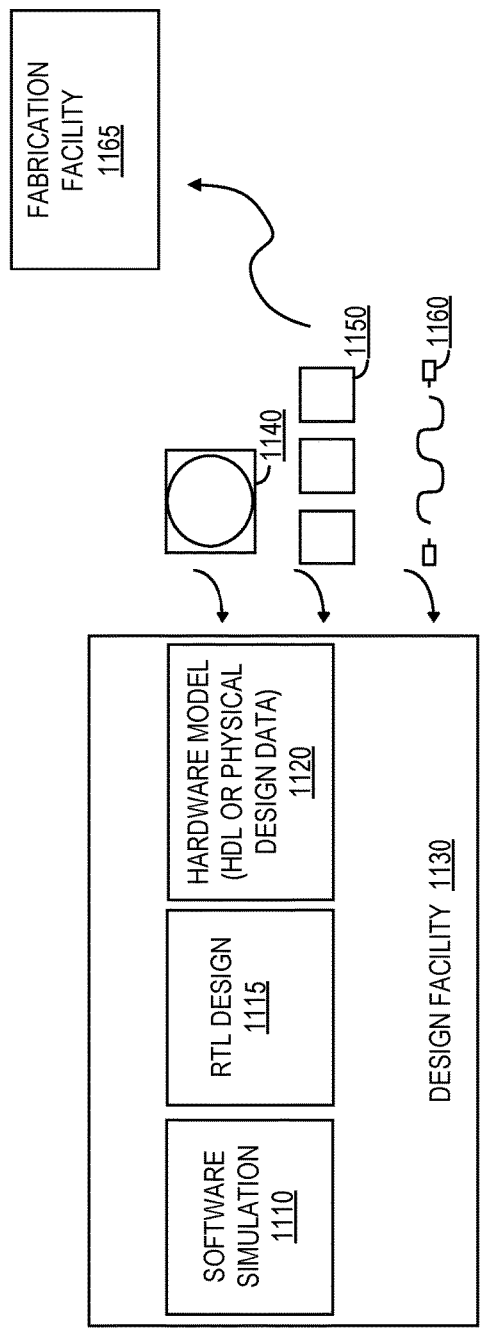
FIG. 13 is a block diagram of an example of an intellectual property (IP) core development system according to an embodiment.

FIG. 13 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 11001112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 14:
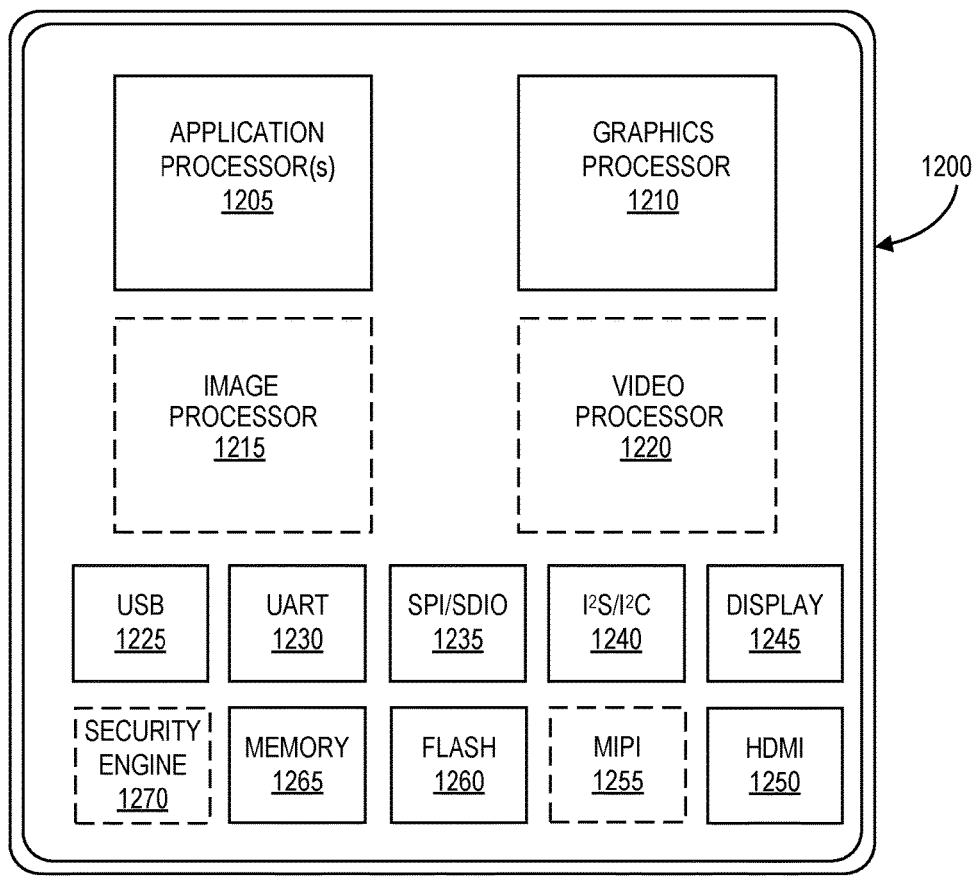
FIG. 14 is a block diagram of an example of a system on a chip integrated circuit according to an embodiment.

FIG. 14 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Additional Notes and Examples

Example 1 may include a computing system comprising a display device to present a barreled image, a lens to distort the barreled image, a substrate, and a display pipeline coupled to the substrate, wherein the display pipeline is to: barrel an initial image to form the barreled image, and provide the barreled image to the display device via a device driver.

Example 2 may include the computing system of example 1, wherein the display pipeline is further to composite a plurality of image planes to form the initial image.

Example 3 may include the computing system of example 1, wherein the display pipeline is further to perform chromatic correction of the initial image.

Example 4 may include the computing system of example 1, wherein the display pipeline includes at least one fixed-function element selected from the group consisting of an application specific integrated circuit, a complementary metal oxide semiconductor, a transistor-transistor logic and an arithmetic logic unit.

Example 5 may include the computing system of example 1, wherein the display pipeline is a fixed-function element.

Example 6 may include the computing system of any one of examples 1-5, wherein the display pipeline is further to apply barrel distortion to the initial image based upon a width of the lens, and a height of the lens to form the barreled image.

Example 7 may include the computing system of example 6, wherein from the width and the height, the display pipeline is to determine for each respective pixel of the initial image, a new position of the respective pixel, a barrel distortion value and a distortion radius, and to store the new position of the respective pixel, the barrel distortion value and the distortion radius in a pixel map, and further wherein the display pipeline is to form the barreled image based upon the pixel map so that with respect to each pixel, the respective pixel is moved to the new position, masked if the barrel distortion value does not equal the distortion radius, and unmasked if the barrel distortion value does equal the distortion radius.

Example 8 may include an enhanced image distortion apparatus comprising a substrate, and a display pipeline coupled to the substrate. The display pipeline is to barrel an initial image to form a barreled image.

Example 9 may include the apparatus of example 8, wherein the display pipeline is further to composite a plurality of image planes to form the initial image.

Example 10 may include the apparatus of example 8, wherein the display pipeline is further to perform chromatic correction of the initial image.

Example 11 may include the apparatus of example 8, wherein the display pipeline is a fixed-function element in a computing device.

Example 12 may include the apparatus of example 8, wherein the display pipeline includes at least one fixed-function element selected from the group consisting of an application specific integrated circuit, a complementary metal oxide semiconductor, a transistor-transistor logic and an arithmetic logic unit.

Example 13 may include the apparatus of any one of examples 8-12, wherein the display pipeline is further to apply barrel distortion to the initial image based upon a width of a lens of a display device, and a height of the lens to form the barreled image.

Example 14 may include the apparatus of example 8, wherein from the width and the height, the display pipeline is to determine for each respective pixel of the initial image, a new position of the respective pixel, a barrel distortion value and a distortion radius, and to store the new position of the respective pixel, the barrel distortion value and the distortion radius in a pixel map, and further wherein the display pipeline is to form the barreled image based upon the pixel map so that with respect to each pixel, the respective pixel is moved to the new position, masked if the barrel distortion value does not equal the distortion radius, and unmasked if the barrel distortion value does equal the distortion radius.

Example 15 may include a method of conducting image distortion comprising barreling an initial image, with a display pipeline coupled to a substrate, to form a barreled image to be presented via a display device.

Example 16 may include the method of example 15, further including compositing, with the display pipeline, a plurality of image planes to form the initial image.

Example 17 may include the method of example 15, further including performing chromatic correction, with the display pipeline, of the initial image.

Example 18 may include the method of example 15, wherein the display pipeline is a fixed-function element in a computing device.

Example 19 may include the method of example 15, wherein the display pipeline includes at least one fixed-function element selected from the group consisting of an application specific integrated circuit, a complementary metal oxide semiconductor, a transistor-transistor logic and an arithmetic logic unit.

Example 20 may include the method of any one examples 15-19, wherein the barreling the initial image includes applying, with the display pipeline, a barrel distortion to the initial image based upon a width of the lens, and a height of the lens.

Example 21 may include the method of example 20, wherein the barreling the initial image includes, with the display pipeline, determining, from the width and the height, for each respective pixel of the initial image, a new position of the respective pixel, a barrel distortion value and a distortion radius, and storing the new position of the respective pixel, the barrel distortion value and the distortion radius in a pixel map, and forming the barreled image based upon the pixel map so that with respect to each pixel, the respective pixel is moved to the new position, masked if the barrel distortion value does not equal the distortion radius, and unmasked if the barrel distortion value does equal the distortion radius.

Example 22 may include an enhanced image distortion apparatus comprising a substrate, and a display pipeline coupled to the substrate, wherein the display pipeline is to composite a plurality of image planes to form an initial image.

Example 23 may include the apparatus of example 22, wherein the display pipeline is further to perform chromatic correction of the initial image.

Example 24 may include the apparatus of any one of examples 22-23, wherein the display pipeline includes at least one fixed-function element selected from the group consisting of an application specific integrated circuit, a complementary metal oxide semiconductor, a transistor-transistor logic and an arithmetic logic unit.

Example 25 may include the apparatus of example 22, wherein the display pipeline is to composite the image planes so that the initial image includes display image depth planes that are at different depths from each other.

Example 26 may include an enhanced image distortion apparatus comprising display pipeline means for barreling an initial image to form a barreled image to be presented via a display device.

Example 27 may include the apparatus of example 26, wherein the display pipeline means is for compositing a plurality of image planes to form the initial image.

Example 28 may include the apparatus of example 26, wherein the display pipeline means is for performing chromatic correction of the initial image.

Example 29 may include the apparatus of example 26, wherein the display pipeline means is a fixed-function element in a computing device.

Example 30 may include the apparatus of example 26, wherein the display pipeline means includes at least one fixed-function element selected from the group consisting of an application specific integrated circuit, a complementary metal oxide semiconductor, a transistor-transistor logic and an arithmetic logic unit.

Example 31 may include the apparatus of any one of examples 26-30, further wherein the display pipeline means is for applying a barrel distortion to the initial image based upon a width of a lens of the display device, and a height of the lens.

Example 32 may include the apparatus of example 31, wherein the display pipeline means is for, from the width and the height, determining for each respective pixel of the initial image, a new position of the respective pixel, a barrel distortion value and a distortion radius, and storing the new position of the respective pixel, the barrel distortion value and the distortion radius in a pixel map, and further wherein the display pipeline means is for forming the barreled image based upon the pixel map so that with respect to each pixel, the respective pixel is moved to the new position, masked if the barrel distortion value does not equal the distortion radius, and unmasked if the barrel distortion value does equal the distortion radius.

Technology described herein may therefore enable a better VR experience in which users are able to read text more easily. Indeed, the technology may improve operation of the HMD system so that the entire scene may be rendered in a sharper fashion.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A computing system comprising:
a display device to present a barreled image;
a lens to distort the displayed barreled image that is displayed by the display device;
a substrate; and
a display pipeline coupled to the substrate, wherein the display pipeline is to:
apply a barrel distortion to an initial image to form the barreled image so that the barreled image has a shape of a barrel,
provide the barreled image to the display device to be displayed by the display device,
determine for each respective pixel of the initial image, a new position of the respective pixel, a barrel distortion value of the respective pixel and a distortion radius of the respective pixel,
store, for each respective pixel of the initial image, the new position of the respective pixel, the barrel distortion value of the respective pixel and the distortion radius of the respective pixel in a pixel map, and
form the barreled image based upon the pixel map so that each respective pixel is
moved to the new position of the respective pixel,
masked if the barrel distortion value of the respective pixel does not equal the distortion radius of the respective pixel, and
unmasked if the barrel distortion value of the respective pixel does equal the distortion radius of the respective pixel.

2. The computing system of claim 1, wherein the display pipeline is further to composite a plurality of image planes to form the initial image.

3. The computing system of claim 1, wherein the display pipeline is further to perform chromatic correction of the initial image.

4. The computing system of claim 1, wherein the display pipeline includes at least one fixed-function element selected from the group consisting of an application specific integrated circuit, a complementary metal oxide semiconductor, a transistor-transistor logic and an arithmetic logic unit.

5. The computing system of claim 1, wherein the display pipeline is a fixed-function element.

6. The computing system of claim 1, wherein the display pipeline is further to apply the barrel distortion to the initial image based upon a width of the lens, and a height of the lens to form the barreled image.

7. The computing system of claim 6, wherein from the width and the height, the display pipeline is to determine for each respective pixel of the initial image, the new position of the respective pixel, the barrel distortion value of the respective pixel and the distortion radius of the respective pixel.

8. An apparatus comprising:
a substrate; and
a display pipeline coupled to the substrate, wherein the display pipeline is to:
apply a barrel distortion to an initial image to form a barreled image so that the barreled image has a shape of a barrel, wherein the barreled image is to be distorted by a lens of a display device, determine for each respective pixel of the initial image, a new position of the respective pixel, a barrel distortion value of the respective pixel and a distortion radius of the respective pixel, store, for each respective pixel of the initial image, the new position of the respective pixel, the barrel distortion value of the respective pixel and the distortion radius of the respective pixel in a pixel map, and form the barreled image based upon the pixel map so that each respective pixel is
- moved to the new position of the respective pixel,
- masked if the barrel distortion value of the respective pixel does not equal the distortion radius of the respective pixel, and
- unmasked if the barrel distortion value of the respective pixel does equal the distortion radius of the respective pixel.

9. The apparatus of claim 8, wherein the display pipeline is further to composite a plurality of image planes to form the initial image.

10. The apparatus of claim 8, wherein the display pipeline is further to perform chromatic correction of the initial image.

11. The apparatus of claim 8, wherein the display pipeline is a fixed-function element in a computing device.

12. The apparatus of claim 8, wherein the display pipeline includes at least one fixed-function element selected from the group consisting of an application specific integrated circuit, a complementary metal oxide semiconductor, a transistor-transistor logic and an arithmetic logic unit.

13. The apparatus of claim 8, wherein the display pipeline is further to apply the barrel distortion to the initial image based upon a width of the lens of the display device, and a height of the lens to form the barreled image.

14. The apparatus of claim 13, wherein from the width and the height, the display pipeline is to determine for each respective pixel of the initial image, the new position of the respective pixel, the barrel distortion value of the respective pixel and the distortion radius of the respective pixel.

15. A method comprising:
applying a barrel distortion, with a display pipeline coupled to a substrate, to an initial image to form a barreled image so that the barreled image has a shape of a barrel, wherein the barreled image is to be presented via a display device and distorted by a lens of the display device determining, with the display pipeline and for each respective pixel of the initial image, a new position of the respective pixel, a barrel distortion value of the respective pixel and a distortion radius of the respective pixel;

storing, with the display pipeline and for each respective pixel of the initial image, the new position of the respective pixel, the barrel distortion value of the respective pixel and the distortion radius of the respective pixel in a pixel map; and forming with the display pipeline, the barreled image based upon the pixel map so that each respective pixel is
- moved to the new position of the respective pixel,
- masked if the barrel distortion value of the respective pixel does not equal the distortion radius of the respective pixel, and
- unmasked if the barrel distortion value of the respective pixel does equal the distortion radius of the respective pixel.

16. The method of claim 15, further comprising compositing, with the display pipeline, a plurality of image planes to form the initial image.

17. The method of claim 15, further comprising performing chromatic correction, with the display pipeline, of the initial image.

18. The method of claim 15, wherein the display pipeline is a fixed-function element in a computing device.

19. The method of claim 15, wherein the display pipeline includes at least one fixed-function element selected from the group consisting of an application specific integrated circuit, a complementary metal oxide semiconductor, a transistor-transistor logic and an arithmetic logic unit.

20. The method of claim 15, wherein the applying the barrel distortion includes applying the barrel distortion to the initial image based upon a width of the lens of the display device, and a height of the lens.

21. The method of claim 20, further comprising:
determining, from the width and the height, for each respective pixel of the initial image, the new position of the respective pixel, the barrel distortion value of the respective pixel and the distortion radius of the respective pixel.

22. An apparatus comprising:
a substrate; and
a display pipeline coupled to the substrate, wherein the display pipeline is to:
composite a plurality of image planes including a first image plane to be viewed through a first lens and a second image plane to be viewed through a second lens different from the first lens, to form an initial image;
apply a barrel distortion to the initial image to form a barreled image so that the barreled image has a shape of a barrel;
determine for each respective pixel of the initial image, a new position of the respective pixel, a barrel distortion value of the respective pixel and a distortion radius of the respective pixel;
store, for each respective pixel of the initial image, the new position of the respective pixel, the barrel distortion value of the respective pixel and the distortion radius of the respective pixel in a pixel map; and
form the barreled image based upon the pixel map so that each respective pixel is
- moved to the new position of the respective pixel,
- masked if the barrel distortion value of the respective pixel does not equal the distortion radius of the respective pixel, and
- unmasked if the barrel distortion value of the respective pixel does equal the distortion radius of the respective pixel.

23. The apparatus of claim 22, wherein the display pipeline is further to perform chromatic correction of the initial image.

24. The apparatus of claim 22, wherein the display pipeline includes at least one fixed-function element selected from the group consisting of an application specific integrated circuit, a complementary metal oxide semiconductor, a transistor-transistor logic and an arithmetic logic unit.

25. The apparatus of claim 22, wherein the display pipeline is to composite the plurality of image planes so that the initial image includes display image depth planes that are at different depths from each other.

* * * * *